(12) United States Patent
Brausam

(10) Patent No.: US 6,690,619 B2
(45) Date of Patent: Feb. 10, 2004

(54) UNDERWATER COMMUNICATION DEVICE

(76) Inventor: Joseph R. Brausam, 611 Westover La., Schaumburg, IL (US) 60193

( * ) Notice: Subject to any disclaimer, the term of this patent is extended or adjusted under 35 U.S.C. 154(b) by 0 days.

(21) Appl. No.: 10/108,113

(22) Filed: Mar. 27, 2002

(65) Prior Publication Data
US 2003/0185102 A1 Oct. 2, 2003

(51) Int. Cl.$^7$ ............................................. H04B 11/00
(52) U.S. Cl. ...................................................... 367/134
(58) Field of Search ............................ 367/134; 7/167; 362/34, 84, 581

(56) References Cited

U.S. PATENT DOCUMENTS

| | | | |
|---|---|---|---|
| 4,366,956 A | | 1/1983 | Kifferstein |
| 4,480,828 A | | 11/1984 | Kifferstein |
| 4,535,392 A | | 8/1985 | Montgomery |
| 4,588,387 A | | 5/1986 | Swenson |
| 4,635,242 A | | 1/1987 | Hart |
| 5,033,142 A | * | 7/1991 | Templeton ................ 7/167 |
| 5,187,691 A | | 2/1993 | Oehme et al. |
| 5,347,436 A | | 9/1994 | Clyde et al. |
| D353,165 S | | 12/1994 | LeMarr et al. |
| 5,400,736 A | | 3/1995 | Gold |
| 5,416,670 A | * | 5/1995 | Authier ................... 362/34 |
| 5,450,810 A | | 9/1995 | Knight |
| 5,652,734 A | | 7/1997 | Fish |
| 6,160,760 A | | 12/2000 | Rayner |

* cited by examiner

Primary Examiner—Daniel T. Pihulic
(74) Attorney, Agent, or Firm—Charles F. Meroni, Jr.; Meroni & Meroni, P.C.

(57) ABSTRACT

An underwater communication device in combination with a chemiluminescent glow stick. The combination comprises a rigid housing having a seat structure for receiving a chemiluminescent glow stick on an outer face of the housing and a loop structure on a second outer face of the housing for attachment to another object. A projectile resides within the rigid housing such that movement of the housing will cause the projectile to move within the housing impacting an inner surface of the housing causing sound vibrations. A chemiluminescent glow stick is engaged with the seat structure, illumination of the glow stick providing means for visual underwater communication. A means for maintaining engagement of the glow stick with the seat structure of the rigid housing maintains the glow stick against the seat structure.

22 Claims, 4 Drawing Sheets

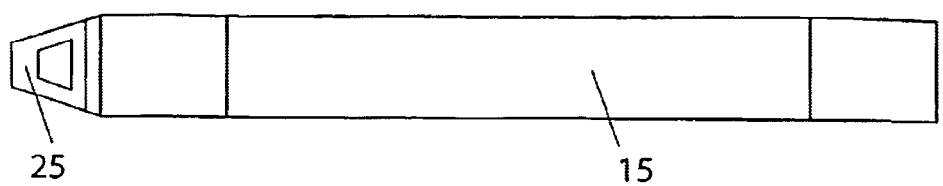
Figure 3
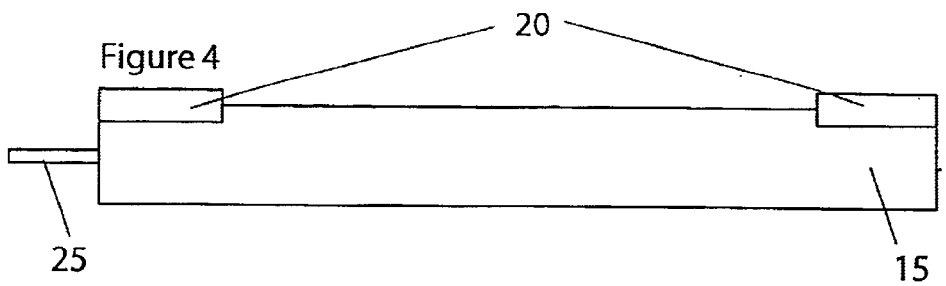
Figure 4
Figure 5 Figure 6
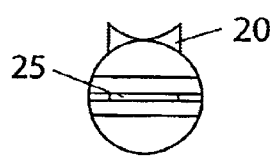 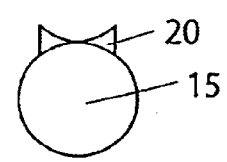
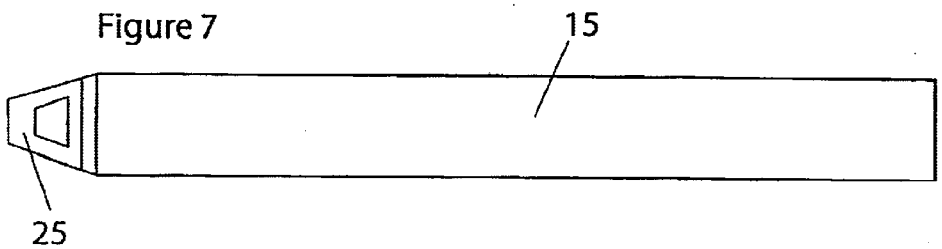
Figure 7

UNDERWATER COMMUNICATION DEVICE

BACKGROUND OF THE INVENTION

1. Field of the Invention

The present invention generally relates to underwater communication devices. More specifically, the present invention relates to multiple medium underwater communication devices.

2. Description of the Prior Art

In order to conduct underwater activities such as scuba diving safely, persons conducting the activity need to effectively communicate with each other. However, it is often difficult to speak with others due to common breathing equipment used during the underwater activities. Therefore, several different types of communication devices have been created to help divers communicate effectively with one another. Due to the fact that sound travels approximately four times as fast in water as compared to air, underwater communication devices have been designed to communicate through sound vibrations. The following previously issued United States patents disclose several of these underwater communication devices.

U.S. Pat. No. 5,652,734 issued to Fish, discloses a Directional Sound Signaling Device. This invention comprises an elongated tube housing with a cylindrical metal piston contained within the tubular housing.

U.S. Pat. No. 5,450,810 issued to Knight, discloses an Underwater Communication Device and Methods. This invention comprises a striker rod contained in a rigid tubular housing. The benefits of this device include the unintentional rattling of the device while a skin diver is swimming.

U.S. Pat. No. 5,400,736 issued to Gold, discloses an Underwater Signaling Device. This device is used by divers and comprises a container with loosely-packed or freely-moving objects in a cylindrical container. The invention also discloses an additional benefit of being made of brightly colored or florescent material.

U.S. Pat. No. 5,187,691 issued to Oehem, discloses an Underwater Signaling Device and Method. This invention comprises a cylindrical chamber containing a projectile no less than half the inner diameter of the cylindrical chamber.

The above underwater communication devices have been designed to communicate by sound vibrations due to the well know fact that sound vibrations travel for great distances in water. However, the above underwater communication devices lack means for visually communicating in dimly lit water.

Divers routinely use separate watertight battery operated lamps to illuminate underwater areas that may be dimly lit and also use them to visually communicate with one another. However, divers often dive in conditions where they do not expect to encounter dimly lit conditions and therefore do not equip themselves with a watertight battery operated lamp relying on natural light to allow body language communication between the divers. Unfortunately, divers may unexpectedly find themselves in dimly lit water and can communicate by sound with one of the above devices but cannot locate the party communicating to them due to dimly lit conditions, resulting in increasing the odds of accident. Therefore, there is a need for an underwater communication device that provides means for communicating by sight as well as by sound in a convenient easily maintained device.

SUMMARY OF THE INVENTION

To fulfill the foregoing need as well as others, the claimed invention provides an underwater communication device.

An objective of the claimed invention is to provide an underwater communication device having means for communicating in multiple mediums.

Another objective of the claimed invention is to provide a multiple medium underwater communication device that is easily maintained.

A further objective of the claimed invention is to provide a low complexity multiple medium underwater communication device with means for visual communication incorporated with a device suited for audible communication.

To achieve the foregoing objectives as well as others, an under water communication device is provided. The underwater communication device comprises a rigid housing having a seat structure for receiving a chemiluminescent glow stick on an outer face of the housing and a loop structure on a second outer face of the housing for attachment to another object. A projectile resides within the rigid housing such that movement of the housing will cause the projectile to move within the housing impacting an inner surface of the housing causing sound vibrations. A chemiluminescent glow stick is engaged with the seat structure, illumination of the glow stick providing means for visual underwater communication. A means for maintaining engagement of the glow stick with the seat structure of the rigid housing maintains the glow stick against the seat structure.

The device may be used in underwater communication in two distinctly different ways. First, the device may be used to communicate to others by way of sound. A person using the device can shake the device causing the projectile within the housing to move about impacting the inner walls of the housing producing sound. The device can also be used to visually communicate with others underwater. Glow sticks of different colors can be used in underwater communication to signify a certain meaning to those viewing the glow stick. More than one glow stick can be used in the device to allow the user to conveniently carry glow sticks of different colors to communicate different messages to other divers, improving underwater communication.

BRIEF DESCRIPTION OF THE DRAWINGS

FIG. 1 shows a perspective view of the underwater communication device.

FIG. 2 shows an exploded view of the underwater communication device.

FIG. 3. FIG. 3 shows a top view of the housing.

FIG. 4. FIG. 4 shows a side view of the housing.

FIG. 5. FIG. 5 shows a tab loop end view of the housing.

FIG. 6. FIG. 6 shows an end view of the housing opposite the tab loop end.

FIG. 7. FIG. 7 shows a bottom view of the housing.

FIG. 8 shows an alternate embodiment of the underwater communication device designed to accommodate two chemiluminescent glow sticks.

DETAILED DESCRIPTION OF THE PREFERRED EMBODIMENT

Figure 1:
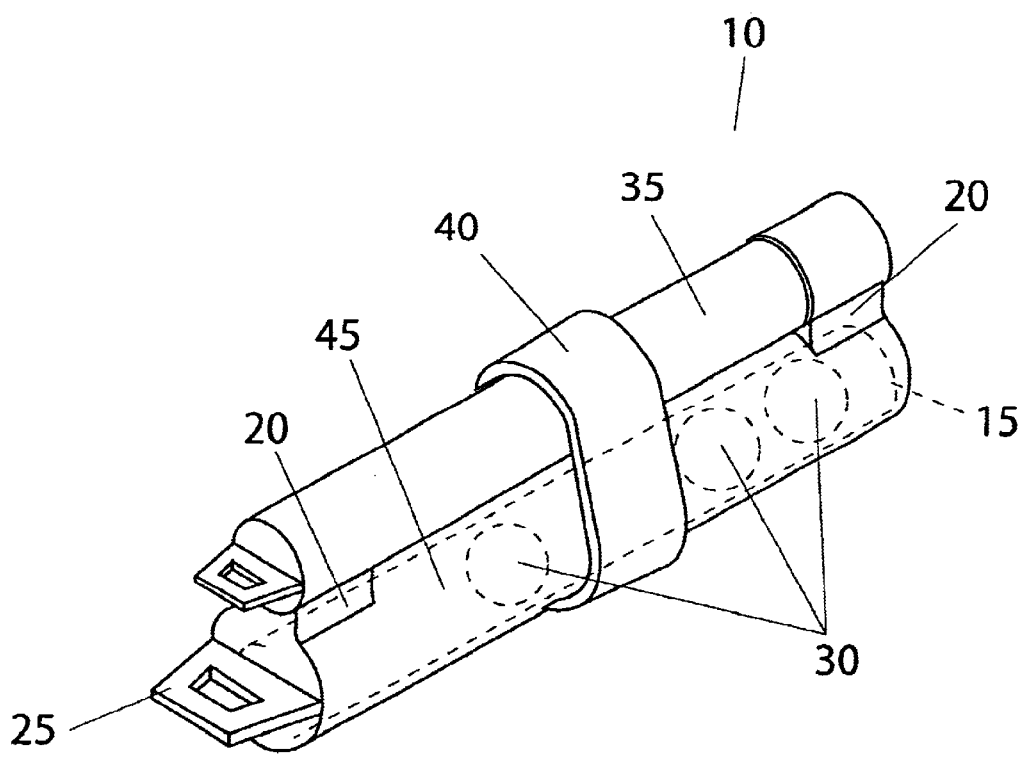
FIG. 1.

Turning now to the drawings, FIGS. 1–7 show a preferred embodiment of the claimed invention used in all different types of underwater diving, hereinafter specifically referring to scuba diving. The underwater communication device 10 shown in FIG. 1 generally consists of a housing 15 with two saddles 20 and a tab loop 25, a number of noise making projectiles 30, a chemiluminescent glow stick 35, and a hook and loop fastener strap 40 commonly sold under the trademark VELCRO.

Figure 2:
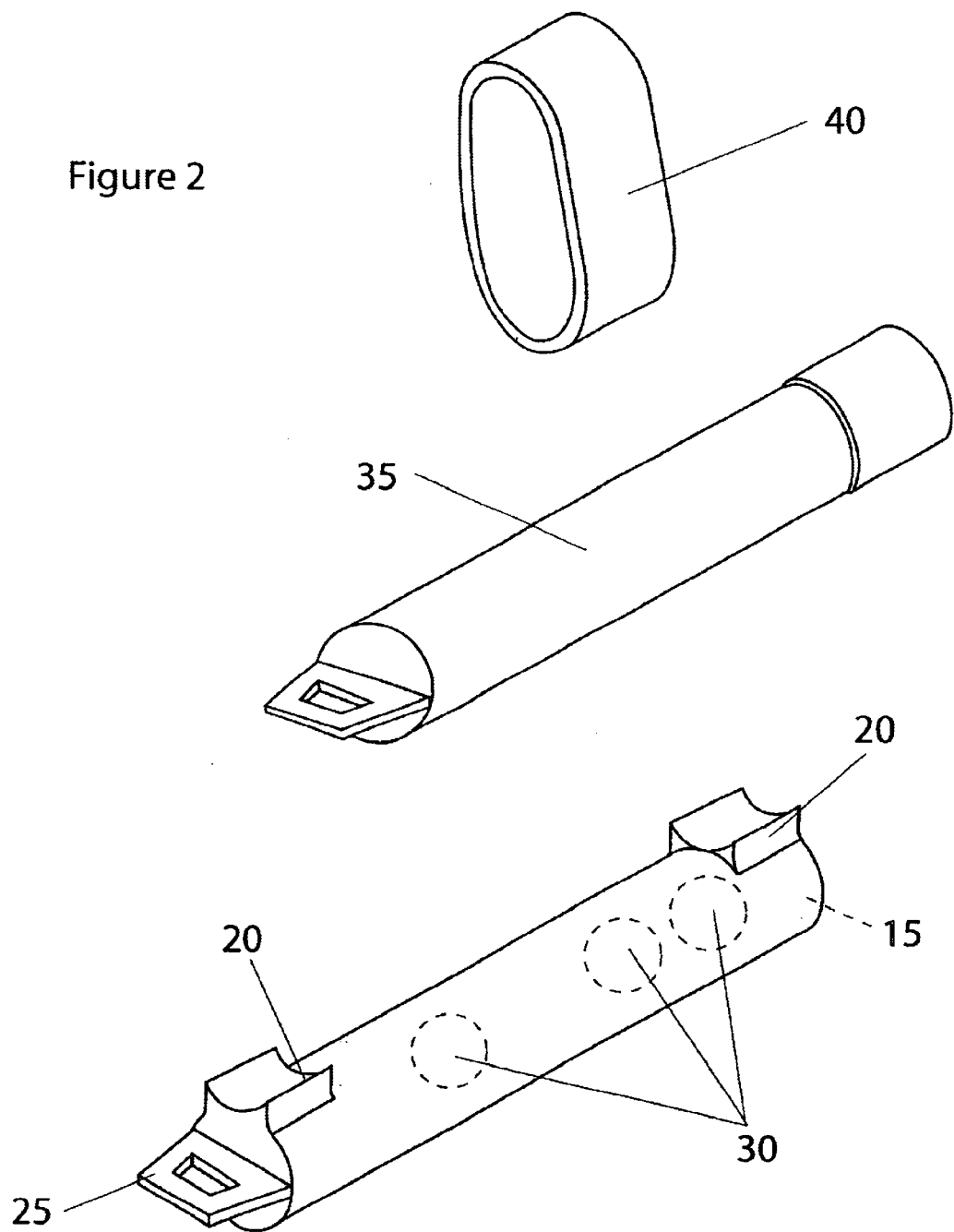
FIG. 2.

The housing 15 shown in FIGS. 3–7 is sized to be hand held, preferably 5 inches long and ½ inch in diameter with a hollow interior cavity 45 making the housing 15 generally tube shaped. The housing 15 is made of approximately ⅛ inch thick plastic making the housing 15 rigid and strongly resistant to deformation. It is contemplated however that the housing 15 could be made of different sizes, shapes, and thicknesses to accommodate different applications. A saddle 20 is located at each end of the housing 15 for holding the chemiluminescent glow stick 35 and are oriented so that the glow stick 35 is held parallel to the long axis of the housing 15. The saddles 20 shown in FIGS. 2, 5, and 6 are approximately ½ inch long and ⅜ inch wide with a ⅜ inch radius dish shaped seat. The saddles 20 may be designed to accept glow sticks 35 of different sizes to accommodate different applications. Further, it is contemplated that more than one set of saddles 20 may be placed about more than one portion of the housing 15 so that more than one glow stick 35 can be utilized in the device.

A tab loop 25 extends from one end of the housing 15 so that the device 10 may be attached to another object such as a scuba diver's vest or belt to prevent the device 10 from being lost during use. The tab loop 25 as shown in FIGS. 3, 4, and 7 is 1/16 inch thick, ½ inch in length, and tapers from a ½ inch width to a ⅜ inch in width. The tab loop 25 may be sized and shaped differently to accommodate different applications.

The noise making projectiles 30 are generally sized and shaped to fit within the hollow interior cavity 45 of the housing 15 so that when the housing 15 is shaken by the diver, the noise making projectiles 30 will move about in the interior cavity 45 of the housing 15 impacting the inner walls creating sound. The noise making projectiles 30 shown in FIGS. 1 and 2 are approximately ⅝ inch in diameter and are made of glass. However, it is contemplated that the noise making projectiles 30 may be made of different sizes and other types of materials such as steel ball bearing type balls to accommodate different applications.

Figure 8:
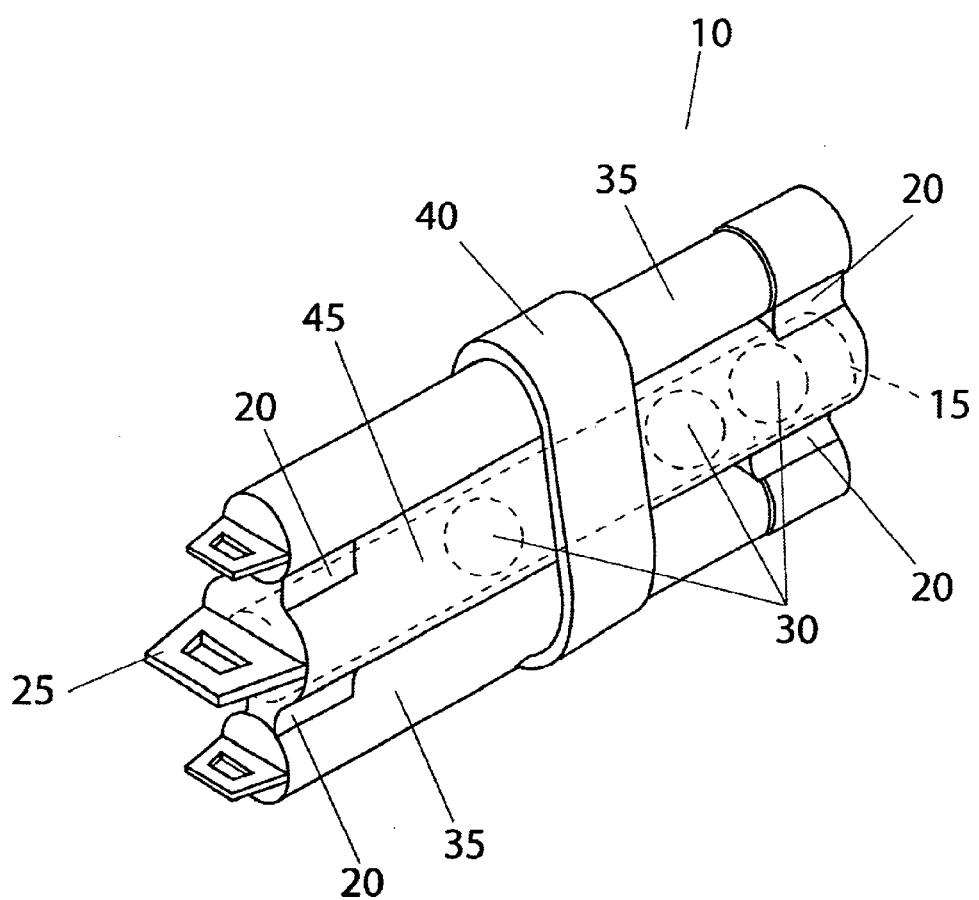
FIG. 8.

The chemiluminescent glow stick 35 shown in FIGS. 1, 2 and 8 is approximately 6 inches long and tapers from ½ inch in diameter to about ⅝ inch in diameter and is readily available from a number of manufacturers such as Unique Industries, Inc. of Philadelphia, Pa. However, it is contemplated that glow sticks 35 of different size may be used in the device for different applications. Glow sticks 35 of this type are generally activated by intermingling the chemical components of the glow stick, usually accomplished by flexing the glow stick 35 along its long axis to break the interior structure dividing the chemical components and then shaking the glow stick to completely intermingle the components. The chemical reaction between the chemical components causes the glow stick 35 to glow illuminating the general area around the glow stick 35. Glow sticks 35 come in many different colors that can be used in underwater communication to signify a certain meaning to those viewing the glow stick 35. This is useful in diving safety. As mentioned above, more than one glow stick 35 can be used in the device to allow the user to conveniently carry glow sticks 35 of different colors to communicate different messages to other divers.

The strap portion of the hook and loop fastener strap 40 shown in FIGS. 1 and 2 is preferably made of nylon webbing ½ inch in width and 5 inches in length. The hook and loop fastener is used to connect the ends of the nylon strap so as to retain the glow stick 35 against the saddles 20. The strap 40 allows glow sticks 35 of different sizes to be used in combination with the housing 15 without having to provide further complicated structure for receiving glow sticks 35 of different diameters.

The device 10 may be used in underwater communication in two distinct different ways. First, the device 10 may be used to communicate to others by way of sound. A person using the device 10 can shake the device 10 causing the projectiles 30 within the housing 15 to move about impacting each other and the inner walls of the housing 15 producing sound. During underwater use, the sound produced by the device 10 will travel through the water to alert others within range of the presence of the person using the device 10. Due to the fact that sound travels through water approximately four times as fast as sound traveling through air, underwater communication by sound is very useful.

The device 10 can also be used to visually communicate with others underwater. Glow sticks 35 of different colors that can be used in underwater communication to signify a certain meaning to those viewing the glow stick 35 such as red signifying distress or green signifying summoning another diver. More than one glow stick 35 can be used in the device 10 to allow the user to conveniently carry glow sticks 35 of different colors to communicate different messages to other divers as shown in FIG. 8. Therefore, this device 10 provides an improved communication device capable of more effectively communicating to others underwater.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. An underwater communication device in combination with a chemiluminescent glow stick, the combination comprising:

a housing sized to be hand held having at least two seat structures sized and shaped for receiving at least one chemiluminescent glow stick on a first outer face of the housing spaced at a predetermined distance apart and oriented to receive the glow stick along a long axis of the housing;

a loop structure on a second outer face of the housing sized and shaped for attachment of the housing to a diving vest;

at least one projectile within the rigid housing sized and shaped such that movement of the rigid housing will cause the projectile to move within the housing impacting an inner surface of the housing causing sound vibrations to be produced;

at least one chemiluminescent glow stick engaged with the seat structures, illumination of the glow stick providing means for visual underwater communication free of mechanical moving parts; and at least one means for maintaining engagement of the glow stick with the seat structure of the rigid housing.

2. The combination of claim 1 wherein the means for maintaining engagement of the glow stick with the seat structures is an adjustable hook and loop fastener, the adjustability of the hook and loop fastener compensating for differences in size of the glow stick.

3. The combination of claim 2 wherein there are three projectiles within the housing sized and shaped such that movement of the housing causes the projectiles to collide together.

4. An underwater communication device, the communication device comprising:
- a rigid housing sized to be hand held having at least two seat structures sized and shaped for receiving at least one chemiluminescent glow stick on a first outer face of the housing, the seat structures being spaced at a predetermined distance apart and oriented to receive the glow stick along a long axis of the housing; and
- at least one projectile within the rigid housing sized and shaped such that movement of the rigid housing will cause the projectile to move within the housing impacting an inner surface of the housing causing sound vibrations to be produced.

5. The communication device of claim 4 wherein the housing further comprises a loop structure on a second outer face of the housing for attaching the housing to a diving vest.

6. The communication device of claim 5 further comprising a means for adjustably retaining the glow stick against the seat structures.

7. The communication device of claim 6 wherein the means for adjustably retaining the glow stick is at least one hook and loop fastener structure.

8. The communication device of claim 7 wherein there are three projectiles within the rigid housing sized and shaped such that movement of the housing causes the projectiles to collide together.

9. A two way hand operable underwater communication device, the communication device comprising:
- a rigid housing sized to be hand held having a hollow interior cavity;
- at least one projectile within the cavity sized and shaped such that movement of the housing will cause the projectile to move within the cavity impacting an inner surface of the housing causing sound vibrations to be produced;
- a colored chemiluminescent glow stick engaged with the rigid housing providing visual underwater communication the color of the glow stick coinciding with a predetermined communication meaning; and
- at least two seat structures spaced at a predetermined distance apart and oriented to received the glow stick alone a long axis of the housing.

10. The communication device of claim 9 further comprising a means for adjustably retaining the glow stick against the seat structures.

11. The communication device of claim 10 wherein the housing further comprises a loop structure on an outer surface of the housing for attaching the housing to a diving vest.

12. The communication device of claim 11 wherein the means for adjustably retaining the glow stick is at least one hook and loop fastener structure.

13. In an underwater communication device comprising a rigid housing having a hollow interior cavity and at least one projectile within the hollow cavity sized and shaped such that movement of the rigid housing causes the projectile to move with the hollow cavity impacting a surface of the cavity creating sound vibrations, the improvement comprising:
- at least one seat structure sized and shaped for receiving at least one chemiluminescent glow stick on an outer surface of the housing;
- engaging at least one chemiluminescent glow stick with the seat structure, illumination of the glow stick providing means for visual underwater communication; and
- an adjustable hook and loop fastener maintaining the engagement of the glow stick with the seat structure.

14. The underwater communication device of claim 13 wherein the housing has two scat structures spaced at a predetermined distance apart and oriented to receive the glow stick along a long axis of the housing.

15. An underwater communication device especially suited for use during night time hours, the communication device comprising:
- a rigid housing sized to be hand held having a hollow interior cavity;
- at least one projectile within the cavity sized and shaped such that movement of the housing will cause the projectile to move within the cavity impacting an inner surface of the housing causing sound vibrations to be produced;
- a chemiluminescent glow stick engaged with the housing providing visual indication of the origin of the sound vibrations produced by the projectile impacting the inner surface of the housing so that underwater activity can be conducted in dimly light water; and
- at least two seat structures on a first outer surface of the housing for engaging the glow stick spaced at a predetermined distance apart oriented to receive the glow stick along a long axis of the housing.

16. The communication device of claim 15 wherein the housing further comprises a loop structure on a second outer face of the housing for attaching the housing to a diving vest.

17. The communication device of claim 16 further comprising a means for adjustably retaining the glow stick against the seat structures.

18. The communication device of claim 17 wherein the means for adjustably retaining the glow stick is at least one hook and loop fastener structure.

19. An underwater communication device, the device comprising:
- a rigid housing sized and shaped to be hand held having at least one seat structure sized and shaped for receiving at least one chemiluminescent glow stick on a first outer surface of the housing oriented to receive the glow stick along a long axis of the housing; and
- at least one projectile within the rigid housing sized and shaped such that movement of the rigid housing will cause the projectile to move within the housing impacting an inner surface of the housing causing sound vibrations to be produced.

20. The device of claim 19 further comprising a chemiluminescent glow stick engaged with the seat structure of the housing.

21. The device of claim 20 further comprising a means for adjustably retaining the glow stick against the seat structure.

22. The communication device of claim 19 further comprising a loop structure on a second outer surface of the housing for attaching the housing to another object.

* * * * *